July 18, 1933.  P. MÜLLER  1,918,819
RECEIVER APPARATUS FOR WIRELESS COMMUNICATION
Filed Sept. 12, 1931
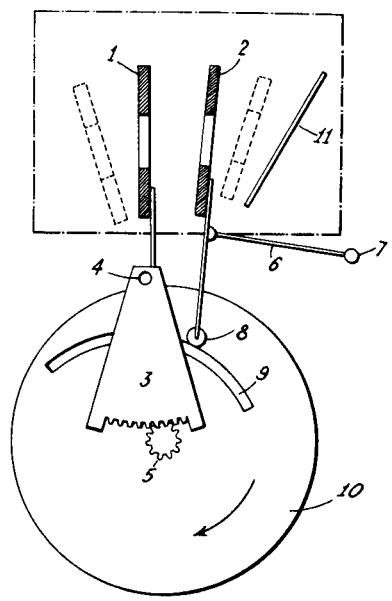
INVENTOR
PAUL MULLER
BY
ATTORNEY Patented July 18, 1933

1,918,819

UNITED STATES PATENT OFFICE

PAUL MÜLLER, OF BERLIN-SIEMENSSTADT, GERMANY, ASSIGNOR TO SIEMENS & HALSKE, AKTIENGESELLSCHAFT, OF SIEMENSSTADT NEAR BERLIN, GERMANY, A CORPORATION OF GERMANY

RECEIVER APPARATUS FOR WIRELESS COMMUNICATION

Application filed September 12, 1931, Serial No. 562,488, and in Germany March 7, 1931.

In receiver apparatus known in the prior art for radio intelligence transmission recourse is mostly had to regeneration for the purpose of enhancing the sensitivity of the equipment. Ordinarily regeneration is secured by means of a distinct regeneration, or tickler, coil in back-feed relationship with the inductance of the oscillation circuit, or a part of this inductance coil. The degree of coupling which is required for optimum reception is subject to marked variations with the incoming wave-length. Also, the number of turns of the tickler coil is of decisive importance. While for short waves only a limited number of turns are required, a great number thereof are needed for long waves.

In case a great wave-length range is to be covered, the proper dimensioning of the tickler coil often is attended with difficulties. The minimum number of turns required for long waves is too great for short waves, and, as a result, no proper back-feed is possible any longer for short-wave work so that excessive regeneration occurs even when turning the dial, but slightly resulting in whistling, and humming, noises that are very troublesome. This inconvenience becomes particularly disagreeable whenever receiver apparatus is used which permits the coverage of wide ranges of wave-lengths without the plugging in of different coils.

In equipment of this kind it is usual to have a variometer in mechanical coupling relation with a condenser so that inductance and capacity are simultaneously altered. For instance, with such a scheme it is possible to cover a wave-length range extending from 200 to 2000 meters without plugging coils. The tickler coil must be dimensioned for the longest wave, i. e., in the present instance for 2000 meters. Now, it is extremely important to insure proper regeneration in the absence of troublesome noises, also, for short waves.

According to the present invention, for a receiver outfit for radio communication comprising regenerative discharge tubes means is used which is adapted to diminish the inductance of the tickler coil automatically with growing frequency and to increase at the same time the damping.

An embodiment of this arrangement according to the invention is shown by way of example in the drawing.

The inductance of the oscillation circuit is denoted by 1, while 2 designates the tickler coil. Coil 1 is attached to a sector 3 pivoted as at 4. The said sector is actuated by a drive wheel 5 so that the coil 1 is able to assume, for instance, a position as shown by the broken lines in the drawing. The tickler coil 2 is attached to a lever 6 which is pivotally supported about the point 7. A pin 8 slides over a cam piece 9 secured upon a revoluble disk 10. The wheel 5 with suitable shaft or spindle, however, is entirely independent of the motion of 10.

When turning 10 in the direction of the arrow the coil 2 is caused to move towards the metal plate 11. Also this position is indicated by broken lines. By said movement of the coil 2 towards the metal sheet 11 the inductance of the coil is diminished and the damping raised. Connected with disk 10 is the tuning means of the oscillation circuit.

For instance, the disk 10 may at the same time be designed to serve as a support for the mobile (rotor) coils of a pancake variometer. By turning the drive wheel 5 or the corresponding spindle (which is not illustrated in the drawing), it is possible to insure delicate adjustment of the coupling between the coils 1 and 2. The arrangement is so chosen that upon motion in the direction of the arrow the frequency grows and thus the wave-length diminishes. By choosing suitable dimensions for the coils and the movement of the coil 2 it is possible to make conditions so that slight movements of coil 1 suffice for delicate adjustment of the regeneration.

While I have indicated and described one arrangement for carrying my invention into effect, it will be apparent to one skilled in the art that my invention is by no means limited to the particular organization shown and described but that many modifications may be made without departing from the scope of my invention as set forth in the appended claims.

What is claimed is:

1. In combination, in a high frequency coupling device, an inductance coil, means for moving the coil bodily through a range of positions, a second coil magnetically coupled to said first coil, means independent of the first means for moving the second coil to adjust said coupling, and a metallic body disposed adjacent said first coil whereby movement of the latter towards the body results in a decrease of the inductance of the first coil and an increase in its damping.

2. In combination, in a high frequency coupling device, an inductance coil, means for moving the coil bodily through a range of positions, a second coil magnetically coupled to said first coil, means independent of the first means for moving the second coil to adjust said coupling, and a metallic plate disposed adjacent said first coil in the path of its movement whereby movement of the latter towards the body results in a decrease of the inductance of the first coil and an increase in its damping.

3. In combination, in a high frequency coupling device, an inductance coil, means for moving the coil bodily through a range of positions, a second coil magnetically coupled to said first coil, means independent of the first means for moving the second coil to adjust said coupling, said second means including a pivoted driven support element for the coil and a driving element, and a metallic body disposed adjacent said first coil whereby movement of the latter towards the body results in a decrease of the inductance of the first coil and an increase in its damping.

PAUL MÜLLER.